US007301925B2

(12) United States Patent
Fan et al.

(10) Patent No.: US 7,301,925 B2
(45) Date of Patent: Nov. 27, 2007

(54) COMBINED LAN AND WAN SYSTEM FOR MOBILE RESOURCE MANAGEMENT

(75) Inventors: Rodric C. Fan, Fremont, CA (US); Paresh L. Nagda, Fremont, CA (US); Sandeep Manojkumar Singh, Sunnyvale, CA (US); Kenny Man D. Nguyen, East Palo Alto, CA (US)

(73) Assignee: At Road, Inc., Fremont, CA (US)

( * ) Notice: Subject to any disclaimer, the term of this patent is extended or adjusted under 35 U.S.C. 154(b) by 801 days.

(21) Appl. No.: 10/095,210

(22) Filed: Mar. 8, 2002

(65) Prior Publication Data

US 2003/0169710 A1 Sep. 11, 2003

(51) Int. Cl.
*H04J 3/24* (2006.01)
*H04L 12/28* (2006.01)
*H04L 12/56* (2006.01)
*G06F 15/16* (2006.01)

(52) U.S. Cl. .................. 370/338; 370/349; 370/389; 709/229

(58) Field of Classification Search ........ 370/252–336, 370/340–349, 401–468; 455/454–456, 572–574; 709/221–238; 342/357
See application file for complete search history.

(56) References Cited

U.S. PATENT DOCUMENTS

| | | | | |
|---|---|---|---|---|
| 5,533,098 A * | 7/1996 | Lee | .................... | 455/426.1 |
| 6,252,878 B1 * | 6/2001 | Locklear et al. | ............ | 370/401 |
| 6,430,416 B1 * | 8/2002 | Loomis | .................... | 455/456.1 |
| 6,493,751 B1 * | 12/2002 | Tate et al. | .................. | 709/221 |
| 6,557,037 B1 * | 4/2003 | Provino | ...................... | 709/227 |
| 6,867,733 B2 * | 3/2005 | Sandhu et al. | ......... | 342/357.07 |
| 6,901,429 B2 * | 5/2005 | Dowling | ..................... | 709/203 |
| 6,920,502 B2 * | 7/2005 | Araujo et al. | ............... | 709/229 |
| 6,981,041 B2 * | 12/2005 | Araujo et al. | ............... | 709/224 |
| 6,982,966 B2 * | 1/2006 | Eidenschink et al. | ....... | 370/322 |
| 7,111,060 B2 * | 9/2006 | Araujo et al. | ............... | 709/224 |
| 2002/0004832 A1 * | 1/2002 | Yoon et al. | .................. | 709/229 |
| 2002/0059449 A1 * | 5/2002 | Wandel et al. | .............. | 709/238 |
| 2002/0085516 A1 * | 7/2002 | Bridgelall | .................... | 370/329 |
| 2003/0046587 A1 * | 3/2003 | Bheemarasetti et al. | .... | 713/201 |
| 2003/0076785 A1 * | 4/2003 | Purpura | ...................... | 370/252 |
| 2003/0134636 A1 * | 7/2003 | Sundar et al. | ............. | 455/432 |
| 2003/0191799 A1 * | 10/2003 | Araujo et al. | ............... | 709/203 |

\* cited by examiner

*Primary Examiner*—Man U. Phan (57) ABSTRACT

Presented is a method and apparatus for selectively using a local area network and a wide area network in a hybrid network system. A mobile unit receives information, for example positioning information from Global Positioning System satellites. Upon receiving information, the mobile unit associates the information with either a WAN category or a LAN category. Information in the WAN category are transmitted to a WAN computer via a wide area network and information in the LAN category is transmitted to a LAN computer via a local area network. A user may specify which network he wants to use. Alternatively, the mobile unit may be programmed with criteria by which it can categorize the received information. The WAN computer and the LAN computer may be coupled, allowing a user to access the LAN computer via the WAN or the WAN computer via the LAN.

33 Claims, 6 Drawing Sheets

COMBINED LAN AND WAN SYSTEM FOR MOBILE RESOURCE MANAGEMENT

BACKGROUND

1. Field of the Invention

This invention relates to network communication systems and in particular to a communication system including a combination of a Wide Area Network and a Local Area Network.

2. Related Art

Today, many businesses and individuals use computers connected by networks for communication. These computers may be mobile computers with wireless modems. These mobile computers are empowered by mobile data networks and wireless networks, which connect the mobile computers to each other and to various databases. Two primary kinds of networks that provide connectivity to these mobile computers are Local Area Network (LAN) and Wide Area Network (WAN).

A wireless LAN carries high-speed traffic by utilizing a random access technique such as Carrier-Sense Multiple Access (CSMA). An advantage of a wireless LAN is that once installed, there is no significant charge for accessing the LAN. A wireless LAN, however, has a disadvantage of not being able to readily support real time transfer of high-bandwidth data. Furthermore, a wireless LAN is accessible only from a limited geographical coverage area. A LAN is usually used to provide islands of coverage within an office, a building, or a campus. A consequence of the limited cell size is that a wireless LAN is not appropriate for access from a high-speed mobile unit. If a mobile unit moves quickly through many cells, the network is not able to keep track of the mobile unit.

A wireless WAN, unlike a LAN, supports real time data transfers and provides a greater guaranteed bandwidth. Furthermore, a wireless WAN provides ubiquitous coverage so a user of a wireless WAN can expect to be able to access the network from almost anywhere. As a result of the sufficiently large cell size, a wireless WAN can support high-speed mobility. Even a mobile unit moving at a high speed does not rapidly traverse different cells because each cell covers a large area. A wireless WAN, however, has a disadvantage of being expensive to access because it is accessed through a mobile data base station (e.g., CDMA, CDPD, GSM). Accessing a WAN wirelessly results in airtime charges, which could make frequent access for long periods of time expensive.

Since a wireless LAN and a wireless WAN have different sets of advantages and disadvantages, a system that allows a user to take advantage of the strengths of each network without suffering the disadvantages is needed.

SUMMARY

Presented is a method and apparatus for selectively transmitting and receiving data via a local area network and a wide area network. According to one embodiment of the present invention, a mobile unit receives positioning information from a source (e.g., Global Positioning System satellites) and processes the received positioning information to obtain data such as current location, current velocity, and travel distance. The mobile unit also receives data from one or more sensors through electrical connections between the mobile unit and the sensor(s). If the mobile unit is placed in an automobile, for example, sensors may be attached to the ignition, the doors, and inside the fuel tank to indicate the status of the ignition, the doors, and the fuel level. The mobile unit continually receives data from a positioning data source and the sensor(s).

Upon receiving and processing data, the mobile unit associates the data with a category to indicate whether the data should be transmitted via a wide area network or a local area network. The association may be made based on a user specification or a programmed, predetermined criterion. In one embodiment, the mobile unit transmits time-sensitive data over a WAN and other data (e.g., non-time-sensitive data) over a LAN. By using a LAN for the non-time-sensitive data, the mobile unit decreases the overall use of the WAN, thereby reducing the total airtime charge. At the same time, by transmitting the time-sensitive data via the WAN, the mobile unit takes advantage of the ready accessibility of a WAN in transmitting data that requires real-time transfers.

In addition to receiving data from a positioning data source and sensor(s), the mobile unit receives data from the computers via a WAN and a LAN. For example, a user of the mobile unit may submit a query using a user interface device (e.g., an I/O device). The mobile unit transmits the submitted query via a selected network to a network computer, which then creates a response to the query and transmits the response to the mobile unit so the user can receive it. In accordance with one embodiment, the WAN computer and the LAN computer communicate with each other. For example, the LAN may be integrated into the WAN. The communication link between the two computers allows the mobile unit to obtain non-time-sensitive data stored in the LAN computer immediately, by allowing the mobile unit to communicate with the LAN computer through the WAN. Similarly, the communication link allows the mobile unit to access time-sensitive data stored in the WAN computer without accruing airtime charge, by allowing the mobile unit to communicate with the WAN computer through the LAN.

DETAILED DESCRIPTION

Figure 1:
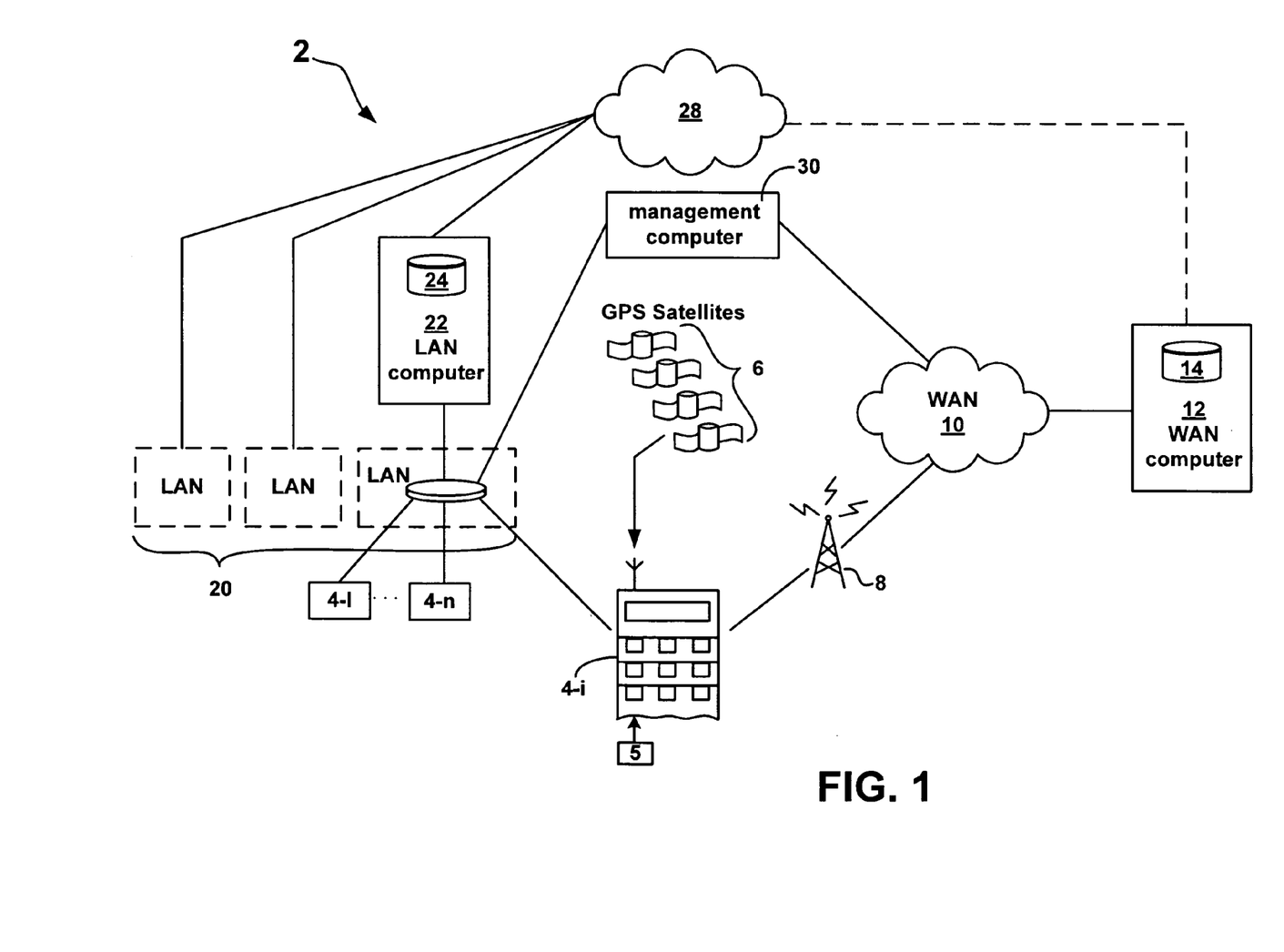
FIG. 1 depicts a hybrid system including a wide area network and a local area network in accordance with an embodiment of the present invention.

FIG. 1 illustrates a hybrid system 2 including mobile units 4-1 through 4-n, a WAN 10, a LAN 20, and a management computer 30 in accordance with an embodiment of the present invention. LAN 20, as used herein, includes at least one LAN. In an embodiment in which LAN 20 includes a plurality of LANs, the LANs may be interconnected to one another. Each LAN is connected to at least one mobile unit, herein denoted as mobile unit 4-*i*. When a network is connected to n mobile units, mobile unit 4-*i* refers to one of mobile units 4-1 through 4-*n*. Mobile unit 4-*i* receives data from GPS satellites 6 and from sensor(s) 5 that is electrically coupled to mobile unit 4-*i*. Mobile unit 4-*i* processes the data received from GPS satellites 6 and sensor(s) 5, associates each of the processed results with one of two general categories, and transmits one category of results to WAN 10 and another category of results to LAN 20. In one embodiment, mobile unit 4-*i* transmits results to WAN 10 via wireless network base station 8. The results that are transmitted to WAN 10 are received by WAN computer 12, which may store the results in WAN computer database 14. Similarly, the results that are transmitted to LAN 20 are received by LAN computer 22, which may store the results in LAN computer database 24. In one embodiment, each LAN in LAN 20 includes a LAN computer with a database. For simplicity, only one LAN and LAN computer are shown in FIG. 1. Depending on the embodiment, WAN computer database 14 and LAN computer database 24 may store just the most recently received data or all the data received within a predetermined time period, e.g., a week.

WAN 10 may be, for example, the Internet. If WAN 10 is the Internet, a person may be allowed to access the data in WAN computer 12 by accessing a web site provided by WAN computer 12. Details on a mobile unit's communication with WAN computer 12 through WAN 10 are provided in U.S. Pat. No. 5,959,577 to Rodric C. Fan et al. entitled "Method and Structure for Distribution of Travel Information Using Network," which is herein incorporated by reference in its entirety. As WAN 10 provides a large coverage area, mobile unit 4-*i* has access to WAN computer 12 from almost anywhere. WAN computer 12 is also referred to herein as "a first remote computer." Also, since mobile unit 4-*i* communicates with WAN 10 via a wireless network base station 8, WAN computer 12 can receive a message mobile unit 4-*i* sends almost instantly, without significant lag time. However, use of wireless network base station 8 costs airtime charge, which can make a mobile unit's communication via WAN 10 expensive.

Connecting LAN 20 to mobile units 4-1 through 4-*n*, LAN computer 22, and management computer 30 is well known in the art. Connections may be wireless. Although the example in FIG. 1 depicts LAN 20 as having a ring topology, this method is not limited to being implemented with a ring topology. Unlike WAN 10, LAN 20 is accessible to mobile unit 4-*i* only within a limited LAN 20 coverage area. Thus, depending on the travel range of mobile unit 4-*i*, LAN 20 may be frequently inaccessible to mobile unit 4-*i*. However, when LAN 20 is accessible, it is accessible without a usage cost such as the airtime charge for accessing WAN 10. Hybrid system 2 combines the ready accessibility of WAN 10 with the low-cost accessibility of LAN 20 and offers mobile unit 4-*i* an option that is less expensive than WAN 10 and more accessible than LAN 20. LAN computer 22 is herein also referred to as "a second remote computer."

Management computer 30 is connected to both WAN 10 and LAN 20 and can communicate with WAN computer 12 and LAN computer 22. A user of management computer 30 can, therefore, access all data that mobile units 4-1 through 4-*n* transmit to WAN computer 12 and LAN computer 22. In addition, management computer 30 can exchange information with mobile unit 4-*i* via WAN 10 or via LAN 20. For example, if management computer 30 is used by a trucking company and mobile unit 4-*i* is a truck owned and operated by the trucking company, the trucking company can send an updated delivery schedule to mobile unit 4-*i* via WAN 10 as the company takes new orders or cancellations.

In another example, management computer 30 is used by an airport to track vehicles associated with the airport (e.g., shuttles, luggage carriers, airplane maintenance vehicles), or to monitor vehicles for security purposes. The airport may include LAN 20 made of a plurality of LANs, each of which is connected wirelessly to vehicles equipped with mobile units. The mobile units installed or placed in the vehicles transmit data (e.g., location data) to a LAN computer 22 that is connected to each LAN, upon entering the coverage area of the particular LAN. Thus, as a vehicle crosses a boundary between LAN coverage areas, the mobile unit for the vehicle transmits data to LAN computer 22 for the newly-entered LAN coverage area. LAN computer 22 receives the data and optionally transmits the data to management computer 30. In addition to or instead of transmitting the data to management computer 30, the mobile units may transmit the data to separate network 28. Separate network 28 may be a public network such as the Internet, or a limited-access network such as a police or FBI security network. A person accessing separate network 28 may retrieve data concerning the vehicles entering and traveling within the airport.

In one embodiment, WAN computer 12 and LAN computer 22 are coupled so that the two computers can exchange data directly, without using mobile unit 4-*i* or management computer 30 as an intermediary. WAN computer 12 can be made to communicate directly with LAN computer 22 in a number of ways. For example, if WAN 10 is the Internet, LAN computer 22 may be an Internet Protocol (IP) station. Data transmission between mobile unit 4-*i* and LAN 20 may use any of the standard protocols well known in the art, for example the IEEE 802.11A or 802.11B protocol. Alternatively, WAN computer 12 and LAN computer 22 may be connected by a separate network 28, or LAN computer 22 may be connected to WAN 10 (e.g., the Internet).

Transmission path(s) between mobile unit 4-*i* and LAN computer 22 or between mobile unit 4-*i* and WAN computer 12 are secured by any of the well-known security measures. For example, transmission between mobile unit 4-*i* and WAN 10 may use one or more of encryption, Virtual Private Network, and user identification using a password. Transmission between mobile unit 4-*i* and LAN 20 may be secured with Secure Sockets Layer protocol and user identification with a password.

Figure 2:
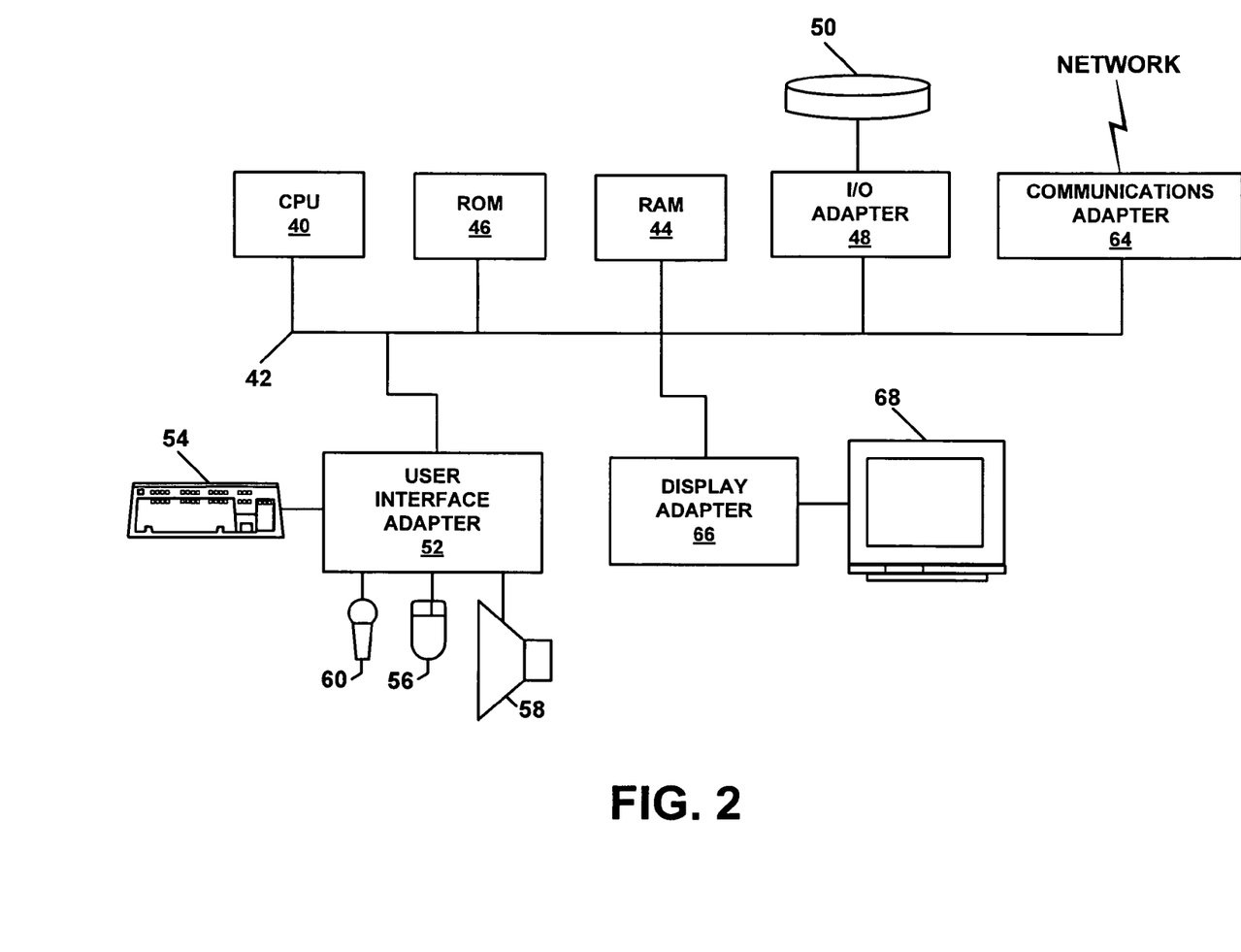
FIG. 2 depicts a hardware environment for a computer connected to a hybrid system in accordance with an embodiment of the present invention.

FIG. 2 depicts the hardware environment of each of WAN computer 12, LAN computer 22, and management computer 30 in accordance with one embodiment of the present invention. A "computer," as used herein, includes a central processing unit 40, such as a microprocessor, and a number of other units interconnected via a system bus 42. A computer usually includes a Random Access Memory (RAM) 44, a Read Only Memory (ROM) 46, and an I/O adapter 48 for connecting peripheral devices such as disk storage units 50 to bus 42, a user interface adapter 52 for connecting a keyboard 54, a mouse 56, a speaker 58, a microphone 60, and possibly other user interface devices such as a Personal Digital Assistant (not shown) to bus 42, a communications adapter 64 for connecting the workstation to a communication network (e.g., a data processing network), and a display adapter 66 for connecting bus 42 to a display device 68. The computer typically has resident thereon an operating system such as Microsoft Windows NT™, 95™, 98™, Me™, 2000™, or XP™ Operating System, IBM OS/2™, Apple MAC™ OS, or UNIX operating systems such as HP-UX, Solaris, or Linux. Those skilled in the art will appreciate that the present invention may also be implemented on platforms and operating systems other than those mentioned above.

Figure 3:
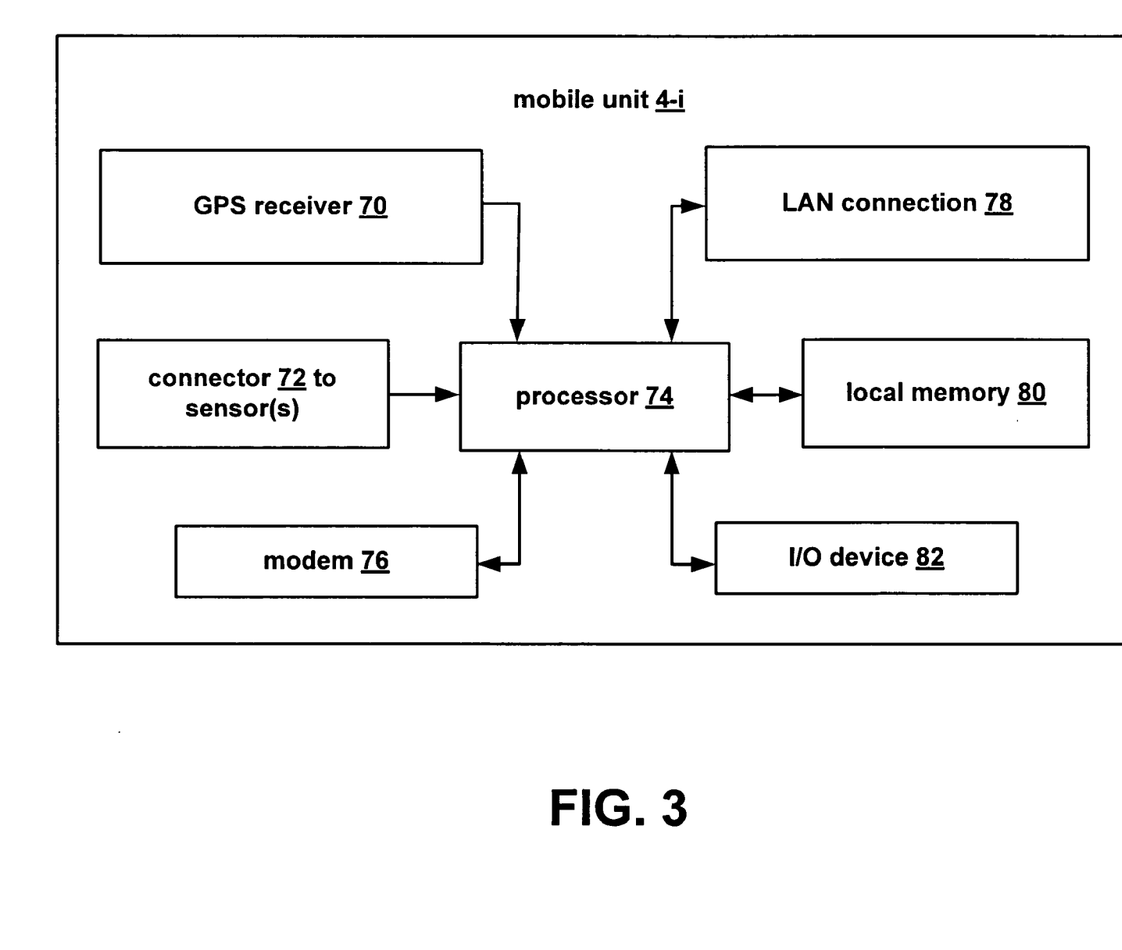
FIG. 3 depicts components of a mobile unit in accordance with an embodiment of the present invention.

FIG. 3 provides components of mobile unit 4-$i$ in accordance with one embodiment of the present invention. Mobile unit 4-$i$ may be, for example, handheld, installed in a vehicle, or clipped onto a belt. Mobile unit 4-$i$ includes a GPS receiver 70, connection 72 to sensor(s) 5, processor 74, modem 76, LAN connection 78, local memory 80, and I/O device 82. Processor 74 receives data from GPS receiver 70, sensor(s) 5, modem 76, LAN connection 78, local memory 80, and I/O device 82. Modem 76, LAN connection 78, local memory 80, and I/O device 82 support two-way data transmission and allow processor 74 to send data to other units or devices. Mobile unit 4-$i$ may be coupled to the battery of a vehicle so that it can be powered on or off independently of the ignition. Mobile unit 4-$i$ may also include a backup battery that automatically supplies power when the main power falls below operating voltage. In one embodiment, mobile unit 4-$i$ includes a computer having a hardware environment of the kind depicted in FIG. 2.

GPS receiver 70 finds GPS satellites 6 and receives the code sequences transmitted by GPS satellites 6. The code sequences include positioning data which processor 74 uses to derive the location (e.g., longitude, latitude, and altitude) of mobile unit 4-$i$. This derivation may include, for example, triangulation. A person of ordinary skill in the art will appreciate that the positioning system is not limited to GPS and that any alternative positioning system, such as time difference of arrival (TDOA), angle of arrival (AOA), ray tracing/pattern recognition, and any combination thereof, may be used. Through GPS receiver 70 or an alternative means for receiving positioning information, processor 74 continually (e.g., every 10 seconds) receives positioning data and is able to derive the location of mobile unit 4-$i$.

Sensor(s) 5, which is electrically coupled to processor 74 via connector 72, may be attached to various parts external the physical boundaries of mobile unit 4-$i$. For example, if mobile unit 4-$i$ is installed in an automobile, sensors may be located to detect the status of the ignition (on or off), the total distance traveled, status of doors and trunk (open or closed), and the fuel level. Processor 74 continually receives new data from the sensor(s) 5 via connector(s) 72 as long as mobile unit 4-$i$ is powered on.

Processor 74 may be implemented with any commercially available processors a person of ordinary skill in the art deems suitable, such as Motorola's MC68331 processor. Processor 74 may use triangulation to convert the GPS code sequences to current location data by converting the GPS code sequences and applying correction factors stored in local memory 80. After correction factors are applied, the resultant location data may include a street address or latitude, longitude, and altitude. Processor 74 reformats the location data to an appropriate protocol (e.g., UDP/IP or IEEE 802.11), and sends the data to WAN 10 via modem 76 or to LAN 20 via LAN connector 78. Processor 74 tracks the location of mobile unit 4-$i$ frequently (e.g., every 10 seconds) by receiving the GPS code sequence, deriving the location data, and sending the location data to WAN computer 12 or LAN computer 22. In one embodiment, processor 74 is configured to forward data to LAN 20 at a regular time interval, for example every minute. In another embodiment, processor 74 is configured to transmit data to LAN 20 whenever mobile unit 4-$i$ enters the LAN coverage area. Yet another embodiment may include a combinational scheme.

Modem 76 may include a CDPD, CDMA, GSM, iDEN, or AMPS module. LAN connection 78 may be wireless. Local memory 80 may include Flash, RAM, ROM, or a combination thereof. I/O device 82 may include but is not limited to a monitor and keyboard, a Personal Digital Assistant, or a microphone and speakers. A person of ordinary skill in the art would understand that mobile unit 4-$i$ also includes various components not explicitly provided herein, such as a chipset and a RTC/system controller.

Figure 4:
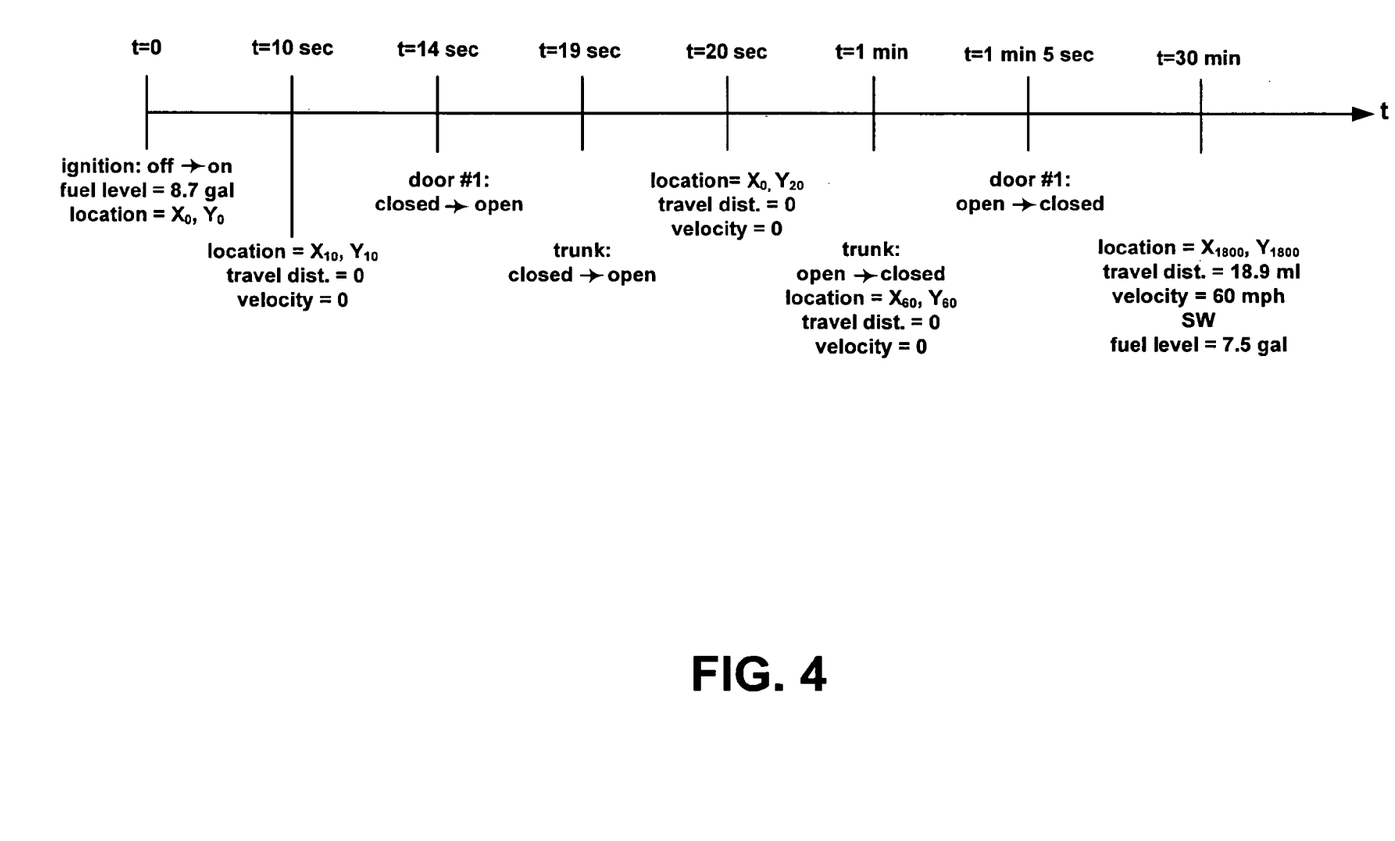
FIG. 4 depicts an exemplary series of data received by a mobile unit in accordance with an embodiment of the present invention.

FIG. 4 depicts an example of data which processor 74 may receive within a limited time frame. At t=0 when mobile unit 4-$i$ is turned on, processor 74 receives a data packet indicating that the ignition is turned on (ignition status changed from "off" to "on"). Also at t=0, processor 74 receives code sequences from GPS satellites 6 and determines that the current location of mobile unit 4-$i$ is "$X_0,Y_0$." In the embodiment of FIG. 4, processor 74 receives positioning data from GPS satellites 6 every 10 seconds. Thus, at every multiple of 10 seconds (t=0, t=10 seconds, t=20 seconds, etc.), processor 74 processes the newly received positioning data to obtain the current location, the distance traveled (calculated based on change in location), and velocity (calculated based on change in location over a time period).

In addition, mobile unit 4-$i$ receives input from sensor(s) 5. For example, at t=0, an ignition sensor indicates that the ignition status changed from "off" to "on" and the fuel sensor indicates that the current fuel level is 8.7 gallons. At t=14 seconds, a signal arrives from door status sensor and informs processor 74 that door #1 (e.g., driver's door) is open. Five seconds later (t=19 seconds), a trunk sensor sends a signal indicating that the trunk is open. Then, at t=one minute and t=one minute and five seconds, the trunk and the door are closed, respectively. At t=30 minutes, the current location of mobile unit 4-$i$ is "$X_{1800}, Y_{1800}$" and it has traveled 18.9 miles. At that point, mobile unit 4-$i$ is traveling in the southwest direction at 60 miles per hour and the fuel level is 7.5 gallons.

In one embodiment, ignition status sensor and door and trunk status sensors may be configured to report the statuses only when there is a change in status. For example, if door #1 is closed at t=0, a first signal at t=0 indicates that the door is closed. A second signal from a door #1 sensor would indicate that door #1 is open. A third signal from door #1 would not be received until door #1 is closed again, regardless of how much time passed from the time the second signal door #1 was received. On the other hand, a fuel level sensor may be programmed to report the fuel level after every predetermined distance is traveled, after a predetermined amount is used, or at a predetermined time interval. Processor 74 continually receives and processes data until mobile unit 4-$i$ is powered off.

After receiving and processing the data, mobile unit 4-$i$ may take one or more of the following actions with the processed data: 1) display the result on I/O device 82 so the user of mobile unit 4-$i$ can receive the information; 2) store the result in local memory 80, and 3) categorize the result and transmit to WAN 10 or LAN 20 based on the category. A person of ordinary skill in the art would know how to accomplish the first two actions. A method of accomplishing the third action is described in detail below, in reference to FIG. 5.

In addition to receiving data from GPS satellites 6 and sensor(s) 5, mobile unit 4-$i$ may receive data from WAN computer 12 and LAN computer 22. WAN computer 12 and LAN computer 22 may be programmed to send data to mobile unit 4-$i$ upon receiving certain patterns of data or data that is higher or lower than a predetermined threshold value. For example, WAN computer 12 may be programmed to send an alert message such as "speed exceeding 90 mph"

if the velocity of mobile unit 4-*i* exceeds 90 miles per hour. Since WAN 10 supports real time data transmission, mobile unit 4-*i* receives the alert message from WAN computer 12 almost as soon as WAN computer 12 sends the alert message. Mobile unit 4-*i* receives message from LAN computer 22 when mobile unit 4-*i* is within the network coverage area. In addition to sending a message to mobile unit 4-*i*, WAN computer 12 or LAN computer 12 may transmit the alert message to management computer 30.

As the value of some messages (e.g., an urgent alert message) diminishes rapidly with time, LAN computer 22 transmits urgent messages to mobile unit 4-*i* through a connection between WAN computer 12 and LAN computer 22 instead of through LAN 20 alone. For example, LAN computer 22 may be programmed to send an alert message to mobile unit 4-*i* when the fuel level drops below a predetermined threshold value (e.g., 2 gallons). In this case, the message is useless if received by mobile unit 4-*i* after the automobile refueled or stalled. Thus, LAN computer 22 may use WAN 10 to send the alert message immediately instead of waiting until mobile unit 4-*i* enters a LAN 20 coverage area. LAN computer 22 transmits through WAN 10 if WAN computer 12 is coupled to LAN computer 22 or a separate network 28 (FIG. 1) is formed between WAN computer 12 and LAN computer 22. An alert message may be sent to management computer 30 in addition to or instead of mobile unit 4-*i*.

When LAN computer 22 and WAN computer 12 are coupled, data in the two computers may be combined in determining whether an alert message should be sent. For example, hybrid system 2 may be programmed to transmit an alert message if LAN computer 22 indicates that a door is open and WAN computer 12 indicates that the velocity is greater than zero, at the same time. Thus, if WAN computer 12 receives data from mobile unit 4-*i* indicating that mobile unit 4-*i* is moving at 20.2 miles per hour and LAN computer 12 receives data from mobile unit 4-*i* indicating that door #1 is open, an alert message may be sent. The alert message may be sent to mobile unit 4-*i*, management computer 30, or both. The alert message may be sent to mobile unit 4-*i* by LAN computer 22 only if mobile unit 4-*i* is within the LAN 20 coverage area or LAN 20 is part of WAN 10. Otherwise, WAN 10 transmits the alert message.

Figure 5:
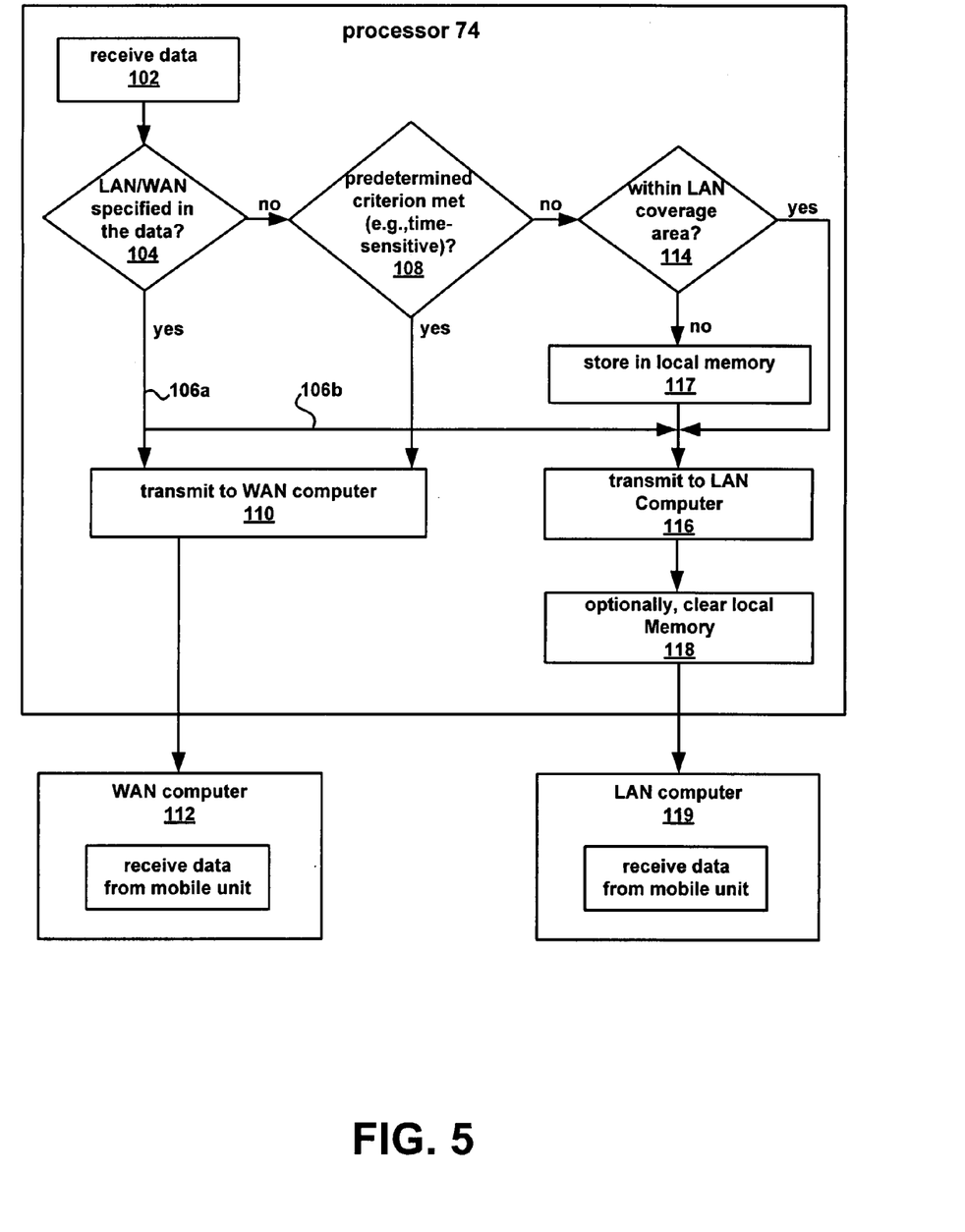
FIG. 5 depicts a flowchart of a categorization process a mobile unit uses to determine which network to transmit to, in accordance with an embodiment of the present invention.

FIG. 5 depicts, in a flowchart, a network selection process 100 whereby processor 74 determines which of the received or processed data it should transmit via WAN 10 and which of the received or processed data it should transmit via LAN 10. Processor 74 may be designed to accept a user preference as to which network he wishes to use. Alternatively, processor 74 may be designed to accept a predetermined value and use the predetermined value to select a network to use. As WAN 10 offers a wider coverage area than LAN 10, data can be transmitted to and received via WAN 10 without the necessity of having to wait until mobile unit 4-*i* enters a limited area. In contrast, to transmit data to LAN 20, mobile unit 4-*i* must be within a small LAN 20 coverage area. As a consequence, data that is to be transmitted to LAN 20 is at least temporarily stored in local memory 80 if mobile unit 4-*i* is outside the coverage area, and later transmitted to LAN 20 from local memory 80 when mobile unit 4-*i* enters the coverage area. Thus, network selection process 100 divides data received by processor 74 between the "WAN category" of data that is to be transmitted to WAN 10 almost instantly and the "LAN category" of data that is to be transmitted to LAN 20. Sometimes, the "LAN category" of data may be stored in local memory 80 before being transmitted to LAN 20.

Network selection process 100 is triggered when mobile unit 4-*i* receives data (stage 102) from GPS satellites 6 or sensor(s) 5. In the particular embodiment, processor 74 allows a user to specify a network, as indicated by stage 104. If the user specified a network, processor 74 follows arrows 106*a* or 106*b* and transmits the received data to the specified network. On the other hand, if the user did not specify a network, processor 74 uses a predetermined criterion to select a network, as indicated by stage 108. The predetermined criterion may be, for example, time-sensitivity. "Time-Sensitivity," as used herein, indicates whether the value of a set of data is changing rapidly enough. For example, if it is likely that a minute of delay between transmission of data by a first device and the receipt of the data by a second device leads the actual value of the data at the time of receipt to be significantly different from the value of the data that is received, the data may be categorized as time-sensitive. Processor 74 may determine whether a set of data is time-sensitive or not based on the source of the data. Data from GPS satellites 6 may be categorized as time-sensitive data to be transmitted via WAN 10, and data from sensors 72 may be categorized as non-time sensitive or statistical data to be transmitted via LAN 20. Alternatively, processor 74 may determine whether a set of data is time-sensitive or not based on the frequency at which that type of data is received. Data that are received at a predetermined time interval, such as location data, may be categorized as time-sensitive. On the other hand, data that are received only when there is a change in status, such as door status and ignition status, may be categorized as non-time-sensitive data. There are other ways to program processor 74 to categorize the data it receives.

After a network is selected (either in stage 104 or 108), processor 74 transmits one category of data, for example the time-sensitive data, to WAN computer 12 via WAN 10 (stage 110). WAN computer 12 then receives data from mobile unit 4-*i* (stage 112). As for the other category including non-time-sensitive data to be transmitted via LAN 20, processor 74 checks if mobile unit 4-*i* is within LAN 20 coverage area (stage 114). For example, processor 74 periodically sends out signals to mobile units and checks for a responsive signal. Mobile unit 4-*i* may periodically send out signals that would be responsive to the signals sent out by LAN computer 22. When mobile unit 4-I is within a LAN coverage area, processor 74 receives a responsive signal. Processor 74 may use the responsive signal to verify that the source of the responsive signal is a registered mobile unit 4-*i*. If processor 74 concludes that the source is not a registered mobile unit, communication may be terminated. On the other hand, if processor 74 verifies that the source is a registered mobile unit 4-*i*, a connection is established between mobile unit 4-*i* and LAN computer 22 (stage 116). In one embodiment, the WAN connection may be terminated automatically upon establishing a LAN connection.

In one embodiment, each of mobile units 4-1 through 4-*n* acts as a LAN client. Each mobile unit 4-*i* is programmed with its own identification mechanism, which may be based on an IP addressing scheme (including Internet Protocol version 6) or a domain naming scheme. These addresses or names may be stored in LAN computer 22 or a domain name server (not shown in FIGS.). When mobile unit 4-*i* sends a signal to processor 74, the signal is validated against the stored list of IP addresses or domain names. A connection is established only f the signal is validated. Once a connection is established between mobile unit 4-*i* and LAN computer 22, the connection between mobile unit 4-*i* and WAN computer 12 may automatically terminate.

If mobile unit 4-*i* is not within the coverage area, processor 74 stores the data that would have been transmitted in local memory 80 (stage 117). Processor 74 transmits the data from local memory 80 to LAN computer 22 later (stage 116), for example when mobile unit 4-*i* enters the coverage area of LAN 20. The content of local memory 80 may be transmitted to LAN computer 22 at a predetermined time interval (e.g., every 15 minutes) or whenever mobile unit 4-*i* is within the LAN 20 coverage area. After the data is transmitted, processor 74 may clear local memory 80 (stage 118) to ensure that there is sufficient memory space for new information. LAN computer 22 receives data from mobile unit 4-*i* via LAN 20 (stage 119). A person of ordinary skill in the art will appreciate that there are other methods of categorizing various information to take advantage of the respective benefits of WAN and LAN. For example, some embodiments may skip stage 114 and store all LAN-bound data in local memory 80.

Network selection process 100 is triggered when mobile unit 4-*i* receives data which induces it to transmit a data packet. Therefore, receipt of an alert message, which does not induce a transmission, does not trigger network selection process 100.

Figure 6:
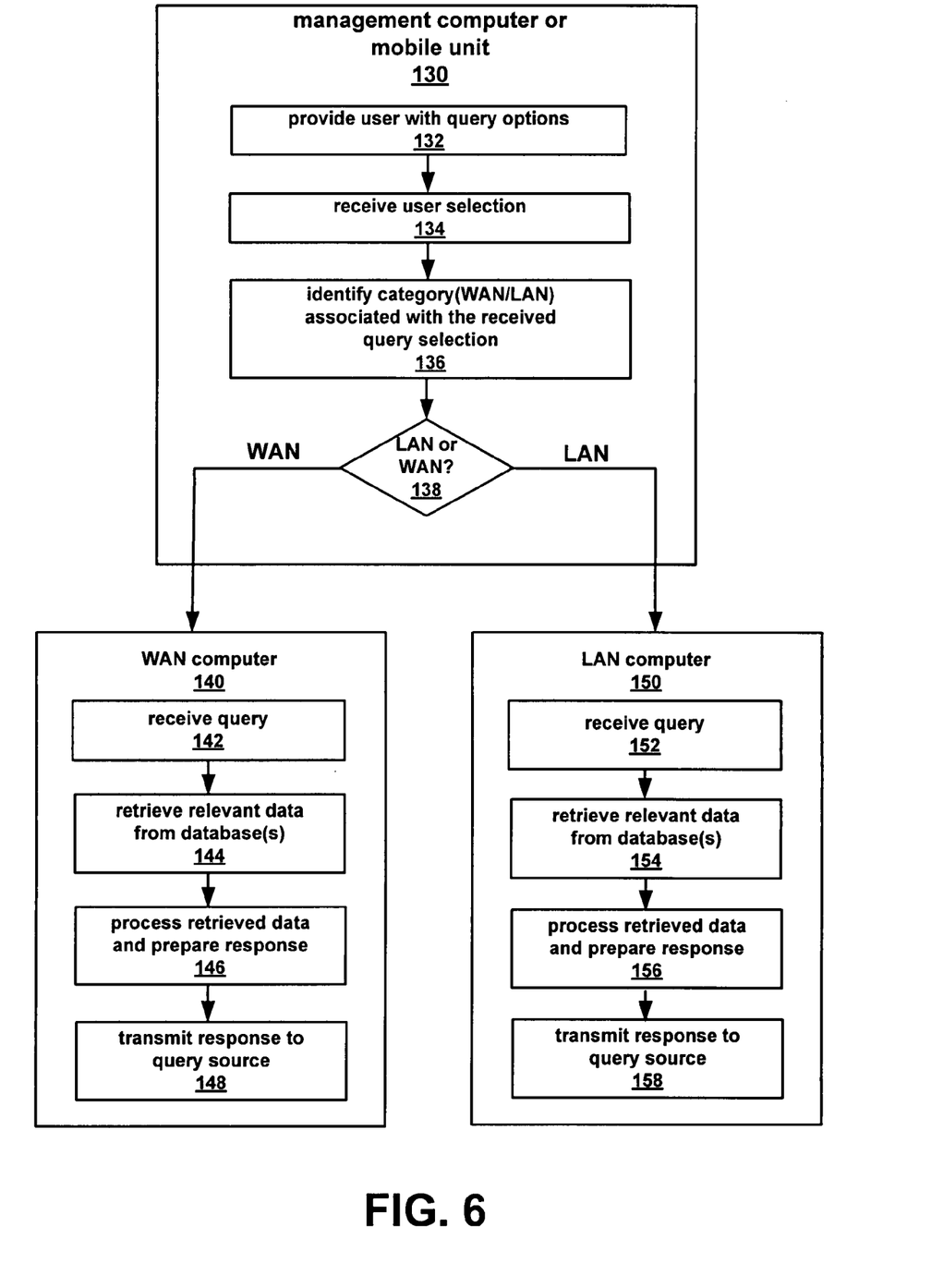
FIG. 6 depicts a query process whereby a mobile unit or a computer connected to at least one network in the hybrid system sends a query to a remote computer connected to a network.

FIG. 6 depicts a query process 120, whereby a user of either mobile unit 4-*i* or management computer 30 submits a query and at least one of WAN computer 12 or LAN computer 14 responds to the query. Query process 120, in accordance with one embodiment of the present invention, includes query submission process 130 and at least one of WAN computer query response process 140 and LAN computer query response process 150.

Query submission process 130 includes mobile unit 4-*i* or management computer 30 providing a user with query options (stage 132) using an I/O device 82. In some embodiments, the query options may be provided in response to the user's conveying that he would like to make a query. For example, if I/O device 82 includes a monitor or a screen, a user may express his wish to make a query by selecting a "query" option by clicking on an icon. In response, mobile unit 4-*i* or management computer 30 may provide a new list of icons, each icon stating a query type such as "current location," "total distance traveled," and "fuel level." Each of the query type options may be associated with either WAN 10 or LAN 20. Thus, when the user selects a query type, mobile unit 4-*i* or management computer 30 receives the selection (stage 134) and identifies the category that is associated with the selected query type (stage 136). Depending on the identified network, mobile unit 4-*i* or management computer 30 transmits the query to either WAN 10 or LAN 20 (stage 138).

If the selected query is a type that is associated with WAN 10, WAN computer 12 receives the query (stage 142), triggering WAN computer query response process 140. WAN computer 12 interprets the query and retrieves the data needed to formulate a response from database 14 (stage 144). With the retrieved data, WAN computer 12 formulates a response (stage 146) and transmits the response back to the device from which the query was initially received (stage 148), via WAN 10. For example, if mobile unit 4-*i* is a delivery truck and management computer 30 is part of a fleet monitoring system of the trucking company, a user of management computer 30 may want to check the location of mobile unit 4-*i* to see if mobile unit 4-*i* could also handle a newly received delivery order. Especially if the newly received order is urgent, the trucking company cannot afford to wait until mobile unit 4-*i* returns to the LAN coverage area to learn the location of mobile unit 4-*i* because the order might be lost by then. By using management computer 30 to query the current location of mobile unit 4-*i*, the trucking company can instantly find out the location of mobile unit 4-*i*.

If the selected query is a type that is associated with LAN 20, LAN computer 22 receives the query (stage 152), triggering LAN computer query response process 150. LAN computer 22 interprets the query and retrieves the data needed to formulate a response from database 24 (stage 154). With the retrieved data, LAN computer 12 formulates a response (stage 156) and transmits the response back to the device from which the query was initially received (stage 158), via LAN 20. For example, in the trucking company situation mentioned above, if the trucking company wants to know the total distance mobile unit 4-*i* traveled for truck maintenance purposes, it is not necessary for the trucking company to obtain that information immediately. In fact, the trucking company can probably wait until mobile unit 4-*i* returns to the LAN 20 coverage area, such as the trucking company's trucking parking lot. Since there is no urgency it is undesirable to accrue airtime charge by accessing the information through WAN 10. Thus, mobile unit 4-*i* or management computer 30 responds to the query when mobile unit 4-*i* returns to the LAN 20 coverage area. In one embodiment, a query may include a request for a report. In this embodiment, the remote computer that receives the query prepares a report, selects a network, and transmits the report via the related network.

If WAN computer 12 and LAN computer 22 are interconnected or linked by separate network 28, mobile unit 4-*i* can transmit to WAN computer 12 a query that requires data in LAN computer 22 to respond to. WAN computer 12 forwards the query to LAN computer 22, which then prepares a response and transmits the response to WAN computer 12. The interconnection between WAN computer 12 and LAN computer 22 allows a user of mobile unit 4-*i* to access the data in LAN computer 22 almost immediately without having to wait until mobile unit 4-*i* is within the coverage area.

While the present invention is illustrated with particular embodiments, it is not intended that the scope of the invention be limited to the specific and preferred embodiments illustrated and described.

What is claimed is:

1. A method of managing mobile resources, said method comprising:
    associating information with one of a first category and a second category according to whether or not the information is time-sensitive, as indicated by a rate at which the information changes, wherein information associated with the first category is first-category information and information associated with the second category is second-category information;
    transmitting said first-category information to a first remote computer via a wide area network; and
    transmitting said second-category information to a second remote computer via a local area network.

2. The method of claim 1, wherein said associating is based on a specification received from a user.

3. The method of claim 1, wherein said information comprises a current location.

4. The method of claim 3, further comprising deriving said current location using one of: a combination of Global Positioning System and triangulation; angle of arrival; time difference of arrival; ray tracing; and pattern recognition.

5. The method of claim 1, wherein said transmitting is done wirelessly from a mobile source.

6. The method of claim 1, further comprising storing said second-category information.

7. The method of claim 6, further comprising removing said second-category information from storage after said transmitting to said second remote computer.

8. The method of claim 1, wherein said first remote computer stores said first-category information and said second remote computer stores said second-category information, further comprising receiving information from at least one of said first remote computer and said second remote computer.

9. The method of claim 1, wherein said first remote computer stores said first-category information and said second remote computer stores said second-category information, further comprising transmitting a query to at least one of said first remote computer and said second remote computer.

10. The method of claim 1, wherein said first remote computer and said second remote computer exchange data.

11. The method of claim 10, further comprising: transmitting a query to said first remote computer; and receiving a response from said first remote computer, said response comprising data stored in said second remote computer.

12. The method of claim 1, wherein said wide area network is the Internet and said second remote computer is connected to the wide area network.

13. The method of claim 1, further comprising receiving data from a sensor via an electrical connection.

14. The method of claim 1, wherein said second remote computer transmits data via a third network.

15. The method of claim 1, wherein said transmitting to said second remote computer occurs when a mobile unit enters a coverage area of said local area network.

16. The method of claim 15, further comprising determining if said mobile unit is in said coverage area by periodically sending a signal to a local area network and checking for a responsive signal.

17. The method of claim 1, wherein said transmitting to one of said first remote computers and said second remote computer occurs at a regular time interval.

18. The method of claim 1, wherein said transmitting occurs via a communication link secured by at least one of an identity verification method, Secured Socket Layer, Virtual Private Network, and encryption.

19. An apparatus for exchanging information, said apparatus comprising:
a processor associating an information with one of a first category and a second category according to whether or not the information is time-sensitive, as indicated by a rate at which the information changes, wherein information associated with the first category is first-category information and information associated with the second category is second-category information;
a first communication link between said processor and a wide area network, said first communication link transmitting first-category information to a first remote computer; and
a second communication link between said processor and a local area network, wherein said second communication link transmitting said second-category information to a second remote computer.

20. The apparatus of claim 19, further comprising a connection to a user interface device receiving the identity of a category with which said information is associated.

21. The apparatus of claim 19, wherein said information comprises a current location.

22. The apparatus of claim 19, further comprising a receiver coupled to said processor, said receiver receiving current location data.

23. The apparatus of claim 22, wherein said current location data comprises code sequences from Global Positioning System satellites.

24. The apparatus of claim 19, wherein at least one of said first and second communication links are wireless.

25. The apparatus of claim 19, further comprising a local memory coupled to said processor, said local memory storing said second-category information.

26. The apparatus of claim 19, further comprising a third communication link between said first remote computer and said second remote computer.

27. The apparatus of claim 19, wherein said apparatus is mobile.

28. The apparatus of claim 27, wherein said wide area network is the Internet and said first remote computer is connected to the Internet.

29. The apparatus of claim 19, further comprising an electrical connection between said processor and a remote sensor.

30. The apparatus of claim 19, wherein said local area network receives information each time said apparatus enters a new local area network coverage area.

31. The apparatus of claim 19, wherein each of said local area network and said wide area network receives information at a regular time interval.

32. The apparatus of claim 19, wherein said local area network is connected to a third network.

33. The apparatus of claim 19, wherein said first communication link and said second communication link are secured by at least one of an identity verification method, Secured Socket Layer, Virtual Private Network, and encryption.

* * * * *